(12) United States Patent
Fredette

(10) Patent No.: US 11,940,938 B2
(45) Date of Patent: Mar. 26, 2024

(54) HYPERVISOR BRIDGING OF DIFFERENT VERSIONS OF AN IO PROTOCOL

(71) Applicant: Dell Products, L.P., Hopkinton, MA (US)

(72) Inventor: Matthew H. Fredette, Belmont, MA (US)

(73) Assignee: Dell Products, L.P., Hopkinton, MA (US)

( * ) Notice: Subject to any disclaimer, the term of this patent is extended or adjusted under 35 U.S.C. 154(b) by 19 days.

(21) Appl. No.: 17/855,907

(22) Filed: Jul. 1, 2022

(65) Prior Publication Data
US 2024/0004820 A1  Jan. 4, 2024

(51) Int. Cl.
G06F 13/38 (2006.01)
G06F 9/455 (2018.01)
G06F 13/40 (2006.01)

(52) U.S. Cl.
CPC ........ *G06F 13/387* (2013.01); *G06F 9/45545* (2013.01); *G06F 9/45558* (2013.01); *G06F 13/4027* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 10,191,865 B1* | 1/2019 | Machulsky | G06F 13/16 |
| 10,331,600 B1* | 6/2019 | Rajadnya | G06F 12/0246 |
| 11,086,801 B1* | 8/2021 | Machulsky | G06F 9/45558 |
| 11,221,972 B1* | 1/2022 | Raman | H04L 67/60 |
| 2007/0136501 A1* | 6/2007 | Chang | G06F 13/4291 711/115 |
| 2013/0219030 A1* | 8/2013 | Szabo | H04L 49/70 709/221 |

* cited by examiner

*Primary Examiner* — Michael Sun
(74) *Attorney, Agent, or Firm* — Anderson Gorecki LLP

(57) ABSTRACT

A hypervisor is configured to bridge I/O operations between the NVMeoPCIe version of the NVMe I/O protocol and the NVMeoF version of the NVMe I/O protocol. By providing a bridging hypervisor, guests can use the NVMePCIe version of the NVMe I/O protocol for storage access operations, while the hypervisor can use the NVMeoF version of the NVMe I/O protocol to implement the storage access operations on attached storage resources of the storage system. The hypervisor handles administrative actions associated with creating, managing, and destroying submission queues and completion queues. Once the desired queue configuration has been created, NVMeoPCIe I/O operations are able to be transparently bridged by the hypervisor, which greatly reduces the amount of processing that would be required if the hypervisor were required to terminate each NVMeoPCIe I/O operation, generate corresponding NVMeoF I/O operations, and keep track of each such pair of I/O operations.

12 Claims, 6 Drawing Sheets

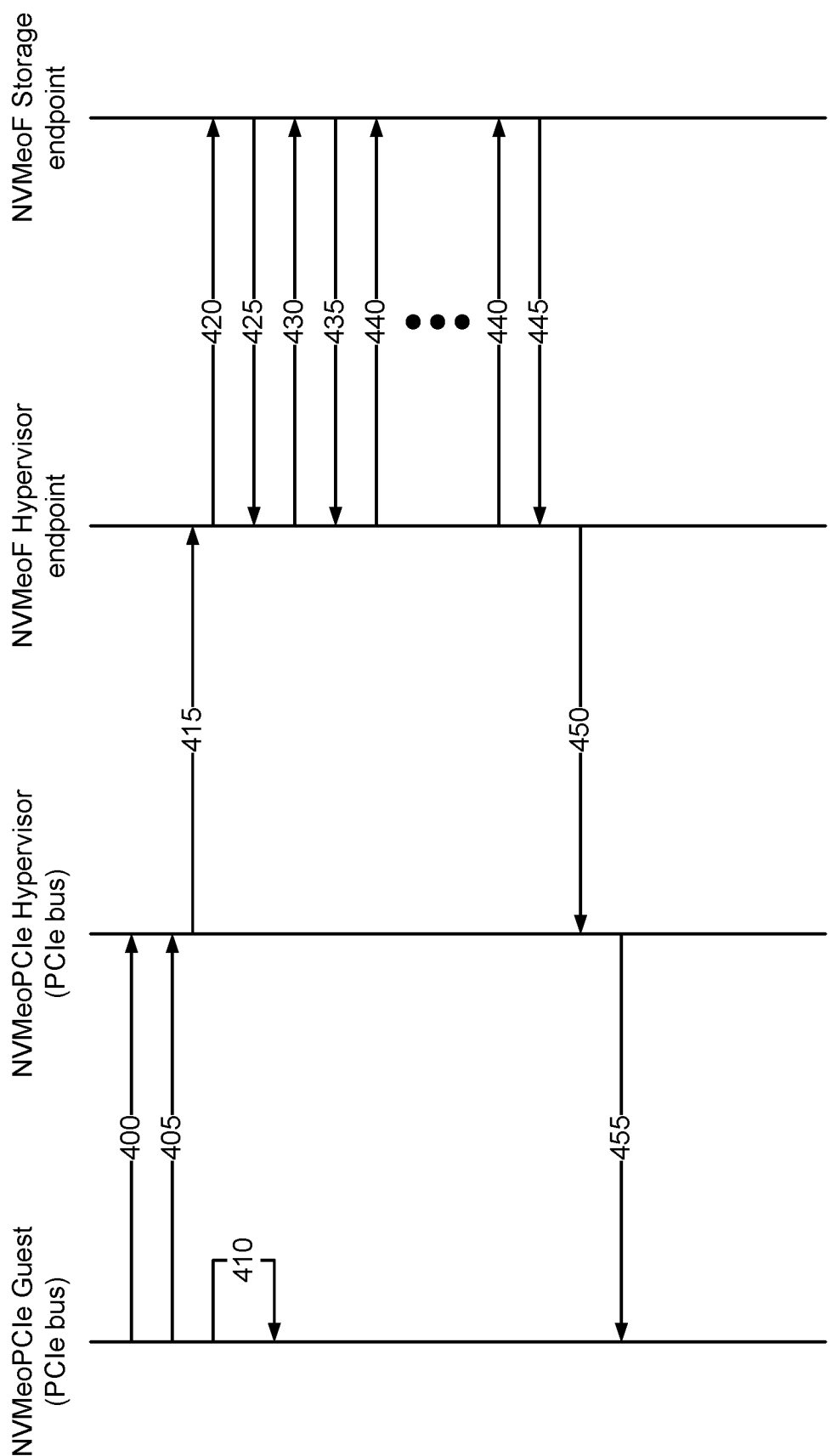

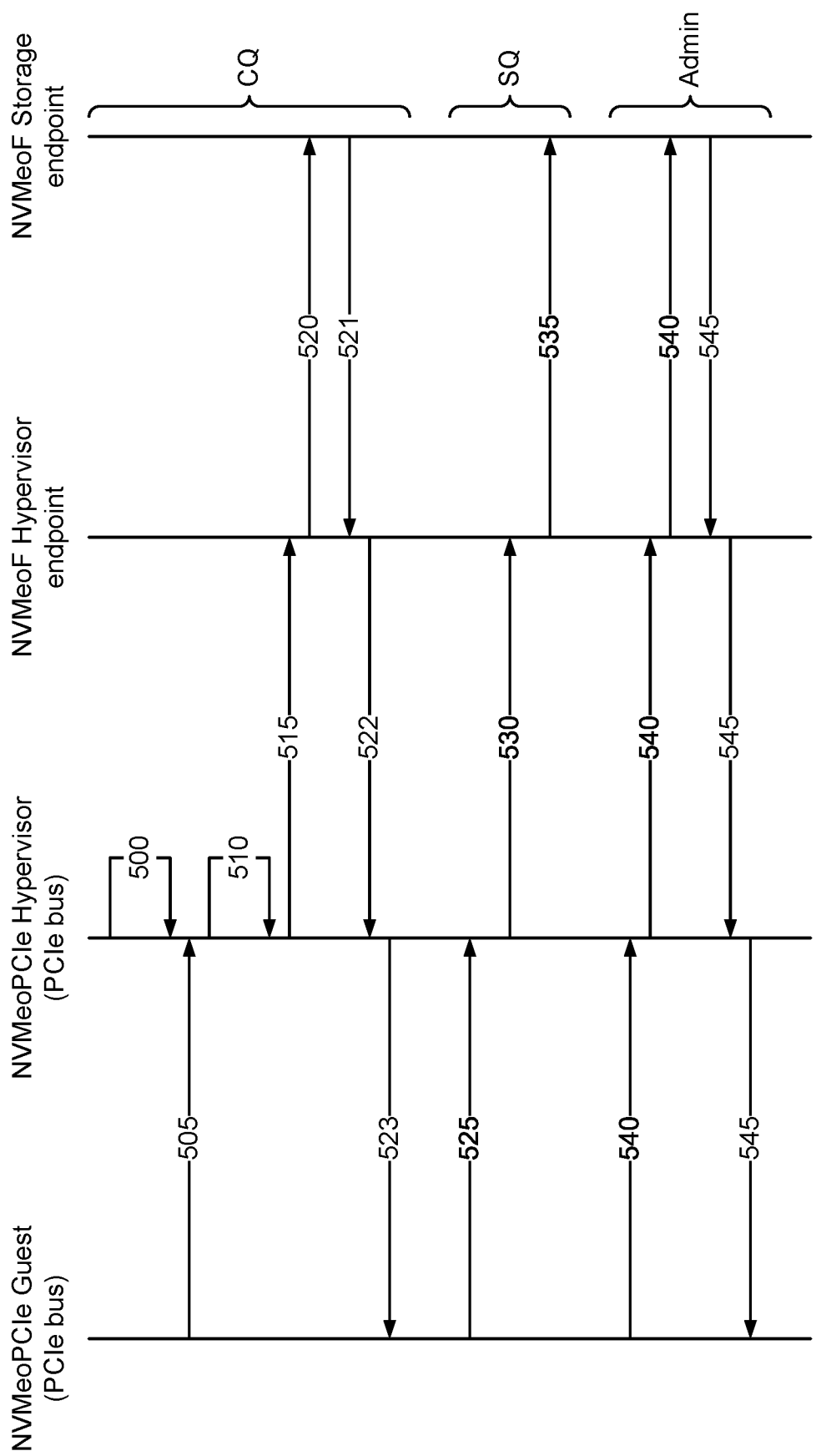

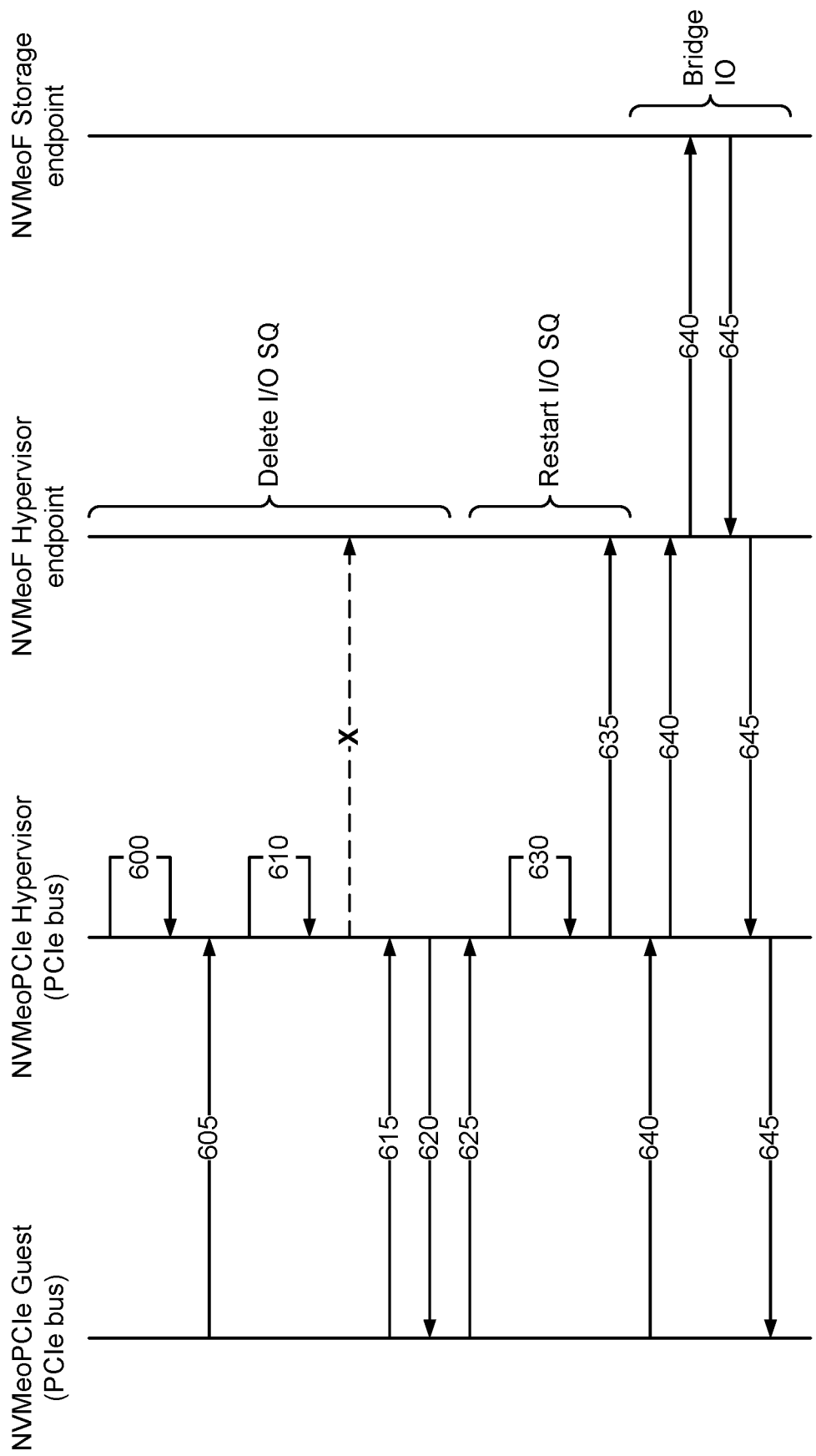

HYPERVISOR BRIDGING OF DIFFERENT VERSIONS OF AN IO PROTOCOL

FIELD

This disclosure relates to computing systems and related devices and methods, and, more particularly, to hypervisor bridging of different versions of an I/O protocol.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A hypervisor is often connected to data storage using the fabric version of an I/O protocol. When there is a local version of the same protocol, the guests of that Hypervisor are often only familiar with the local version, or the guests may simply prefer to use the local version for simplicity.

One such I/O protocol is Non-Volatile Memory express (NVMe). In embodiments where the data storage resources are accessible via a fabric, the hypervisor may connect to the storage resources using the fabric version of the NVMe I/O protocol referred to herein as Non-Volatile Memory Express over Fabric (NVMeoF). In some embodiments, the NVMeoF traffic is transmitted between the hypervisor and attached storage using Fibre Channel.

The hypervisor emulates physical resources of the underlying computer system to present a PC server environment to guests, which enables the guests to operate as a virtual machines on the hypervisor. In some embodiments, the hypervisor emulates a Peripheral Connect Internet Express (PCIe) bus thus enabling the guests executing in the virtual machines to issue NVMe commands on the PCIe bus complex using the PCIe version of the NVMe I/O protocol. The PCIe version of the NVMe I/O protocol is referred to herein as Non-Volatile Memory Express over PCIe (NVMeoPCIe).

According to some embodiments, a hypervisor is provided that is configured to bridge I/O operations between the NVMeoPCIe version of the NVMe I/O protocol, and the NVMeoF version of the NVMe I/O protocol. By providing a bridging hypervisor, guests can use the NVMePCIe version of the NVMe I/O protocol for storage access operations, while the hypervisor can use the NVMeoF version of the NVMe I/O protocol to implement the storage access operations on attached storage resources of the storage system. Rather than terminating the NVMePCIe storage access operations, and then generating new NVMeoF storage access operations, the hypervisor monitors the PCIe bus for administrative operations by the guests associated with creating, managing, and destroying queues, implements corresponding signaling on the attached fabric, and creates, manages, and destroys corresponding queues on the NVMeoF interface. This enables NVMe operations that arrive on the PCIe bus to be transparently bridged by the hypervisor, which greatly reduces the amount of processing that would be required if the hypervisor were required to terminate each NVMeoPCIe I/O operation, generate corresponding NVMeoF I/O operations, and keep track of each such pair of I/O operations.

BRIEF DESCRIPTION OF THE DRAWINGS

FIG. 4 is a swim lane diagram showing operation of example control logic of the NVMeoPCIe to NVMeoF bridge configured to implement administrative submission queue and administrative completion queue creation, according to some embodiments.

FIG. 5 is a swim lane diagram showing operation of example control logic of the NVMeoPCIe to NVMeoF bridge configured to perform I/O submission queue and I/O completion queue creation and bridge unmanaged administrative commands, according to some embodiments.

FIG. 6 is a swim lane diagram showing operation of example control logic of the NVMeoPCIe to NVMeoF bridge configured to delete I/O submission queues, restart I/O queues, and bridge I/O operations between the NVMeoPCIe and NVMeoF versions of the I/O NVMe I/O protocol once the correct set of queues have been created, according to some embodiments.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
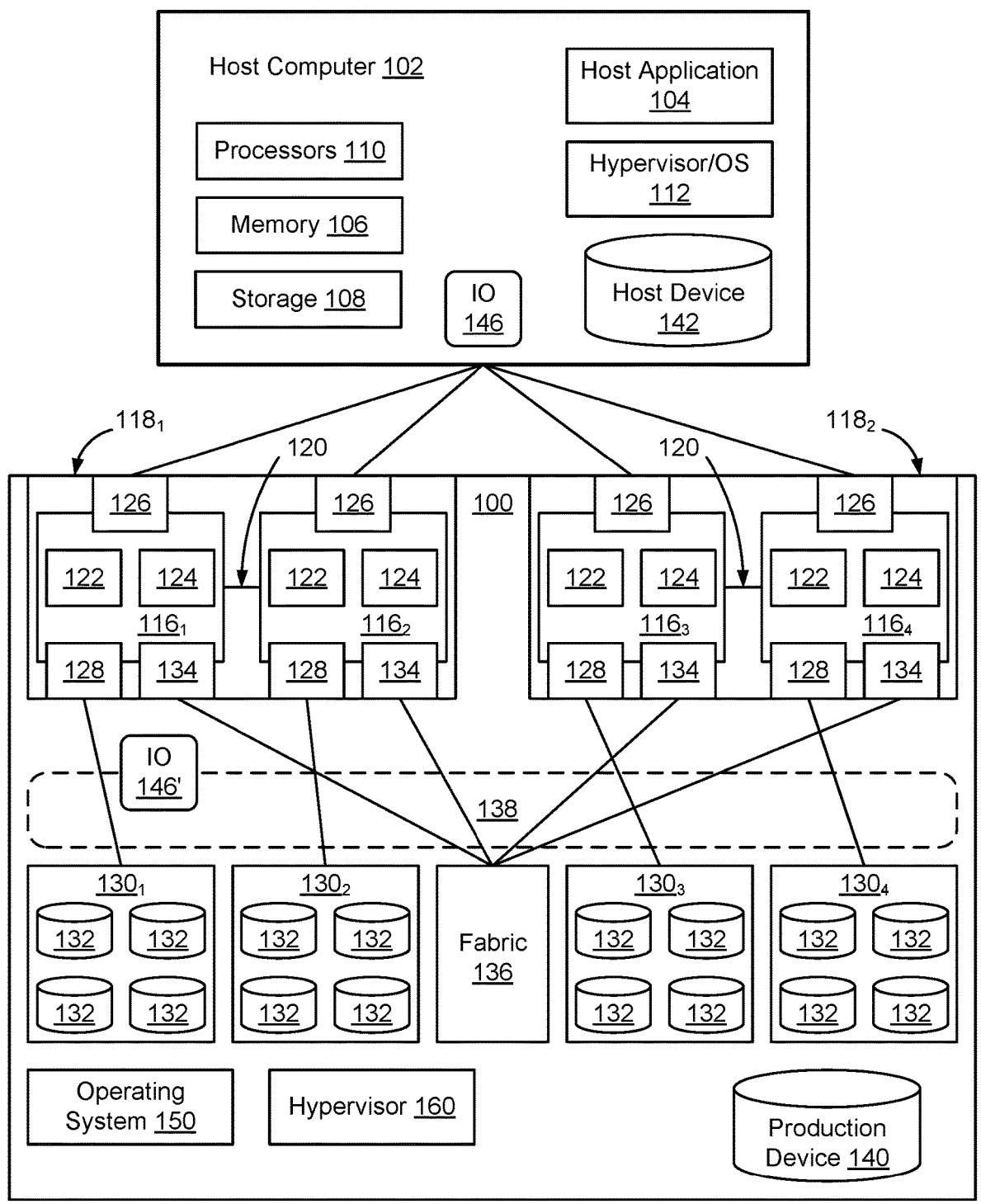
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor/OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). In some embodiments, managed drives 132 are connected to the compute nodes $116_1$-$116_4$, using fabric 136.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an I/O (Input/Output command) 146 from the host application 104 to the host device 142, the hypervisor/OS 112 determines whether the I/O 146 can be serviced by accessing the host volatile memory 106. If that is not possible then the I/O 146 is sent to one of the compute nodes 116 to be serviced by the storage system 100.

In the case where I/O 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the I/O operation 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

As shown in FIG. 1, in some embodiments the storage system includes a hypervisor 160, configured to emulate hardware resources to enable virtual machines to execute using the hardware resources of the storage system. The hypervisor emulates physical resources of the underlying computer system to present a PC server environment to a guest OS, which enables the guest OS to operate as a virtual machine on the hypervisor. Any number of virtual machines may be hosted by the hypervisor. The client virtual machines may be logical entities executed using computing resources (e.g., the hardware components) of the storage system 100. In some embodiments, the hypervisor 160 is implemented as computer instructions, e.g., computer code, stored on a persistent storage that, when executed by the processors 122 of the storage system 100, cause the storage system 100 to provide the functionality of the hypervisor 160 as described in this disclosure.

Figure 2:
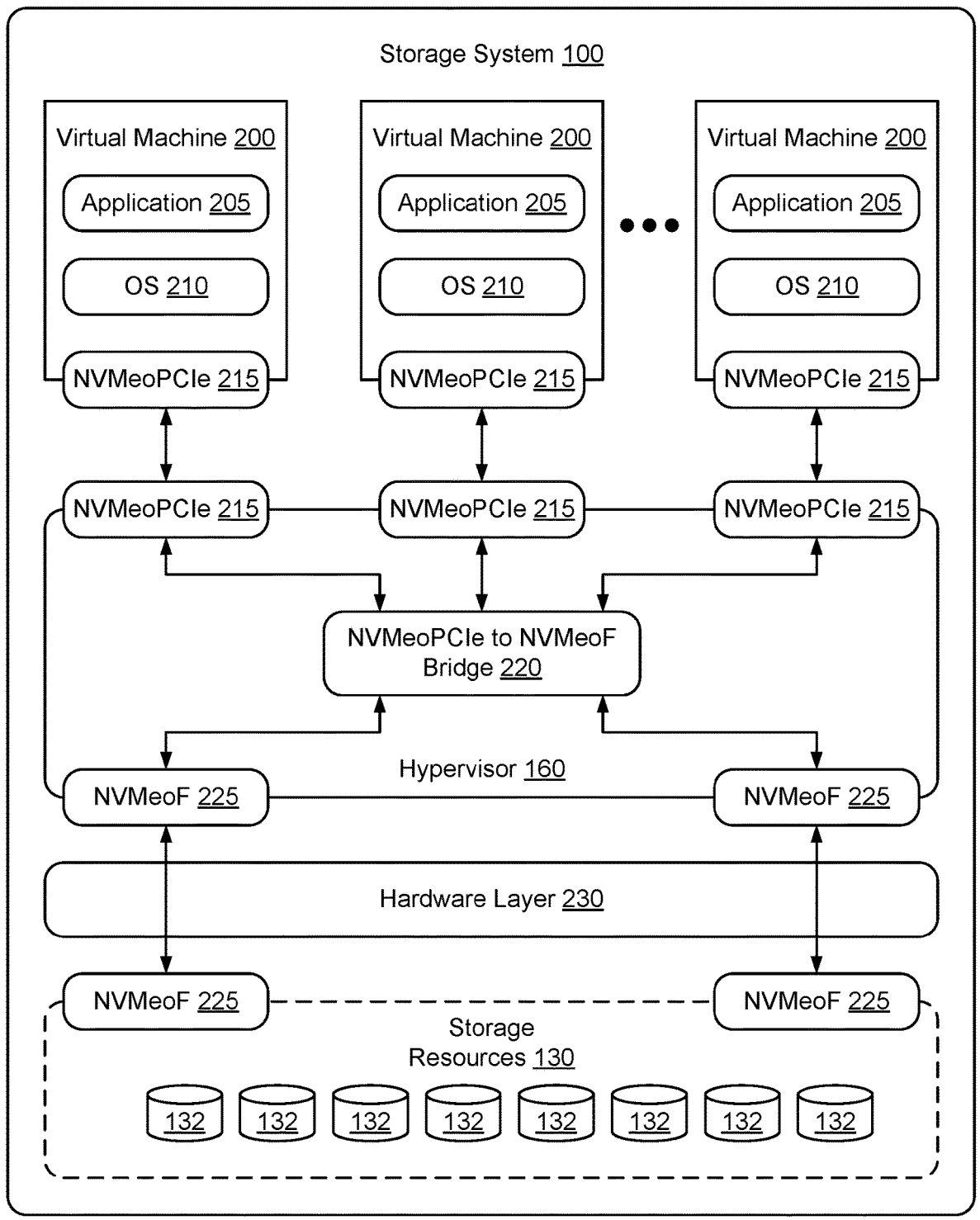
FIG. 2 is a functional block diagram of an example storage system showing aspects of the hypervisor and storage access paths, according to some embodiments.

FIG. 2 is a functional block diagram of an example storage system showing aspects of the hypervisor and storage access paths in greater detail, according to some embodiments. As shown in FIG. 2, in some embodiments the hypervisor 160 abstracts a hardware layer 230 of the storage system 100 from virtual machines 200. The hardware layer 230 includes the actual physical components of the storage system 100, such as the CPUs, busses, memories, and other physical components described above in connection with FIG. 1.

Each virtual machine 200 has a local operating system 210 and one or more applications 205 operating in the context of the local operating system 210. Example applications may include database applications, email servers, etc. The hypervisor emulates physical resources of the hardware layer 230 to present a PC server environment to the guest operating system, which enables the guest to operate as a virtual machine 200 in the storage system 100.

In some embodiments, the hypervisor emulates a PCIe bus thus enabling the guests executing in the virtual machines to issue NVMe commands on the PCIe bus complex to access storage resources 130 provided by the storage system 100. NVMe is an open, logical-device interface specification for accessing a computer's non-volatile storage media, which is usually attached via a PCI Express (PCIe) bus. The hypervisor 160 presents storage resources 130 to the guest OS 210 by emulating a NVMe device attached to the emulated PCIe bus. Accordingly, the guest OS 210 generates NVMe commands and issues the NVMe commands on the PCIe bus using the NVMeoPCIe version of the I/O protocol. The PCIe version of the NVMe I/O protocol is referred to herein as Non-Volatile Memory Express over Peripheral Connect Internet Express (NVMeoPCIe).

As shown in FIG. 2, in some embodiments the hypervisor 160 includes a NVMeoPCIe/NVMeoF bridge 220. The NVMeoPCIe/NVMeoF bridge 220 is configured, in some embodiments, to enable NVMe I/O storage access operations, that are received by the hypervisor from the guest operating systems, and implemented using the NVMeoPCIe version of the NVMe I/O protocol, to be transparently bridged and forwarded by the hypervisor to backend storage resources using the NVMeoF version of the NVMe I/O protocol. Similarly, responses received by the hypervisor from the backend storage resources using the NVMeoF version of the NVMe I/O protocol are transparently bridged and forwarded by the hypervisor to the guest operating system using the NVMeoPCIe version of the NVMe I/O protocol.

In some embodiments the NVMeoPCIe/NVMeoF bridge 220 has control logic configured to listen for administrative commands received from the guest operating systems associated with creating logical structures required to communicate using the NVMeoPCIe version of the NVMe I/O protocol, and responds to the commands by creating corresponding logical structures required to communicate using the NVMeoF version of the NVMe I/O protocol.

In some embodiments, bridging I/O operations between the NVMeoPCIe version of the NVMe I/O protocol and the NVMeoF version of the NVMe I/O protocol is possible, because both versions of the NVMe I/O protocol have the same queue concept. Both protocols are centered around Submission Queues (SQs) for commands, and Completion Queues (CQs) for completions (responses) to those commands. By listening for administrative commands from the guests on the PCIe bus complex that are used to create the submission queues and completion queues, and creating the corresponding queues on the NVMeoF side of the bridge, it is possible to create an environment within the hypervisor that is configured to enable the hypervisor to transparently bridge I/O storage access operations between the two versions of the NVMe I/O protocol.

Figure 3:
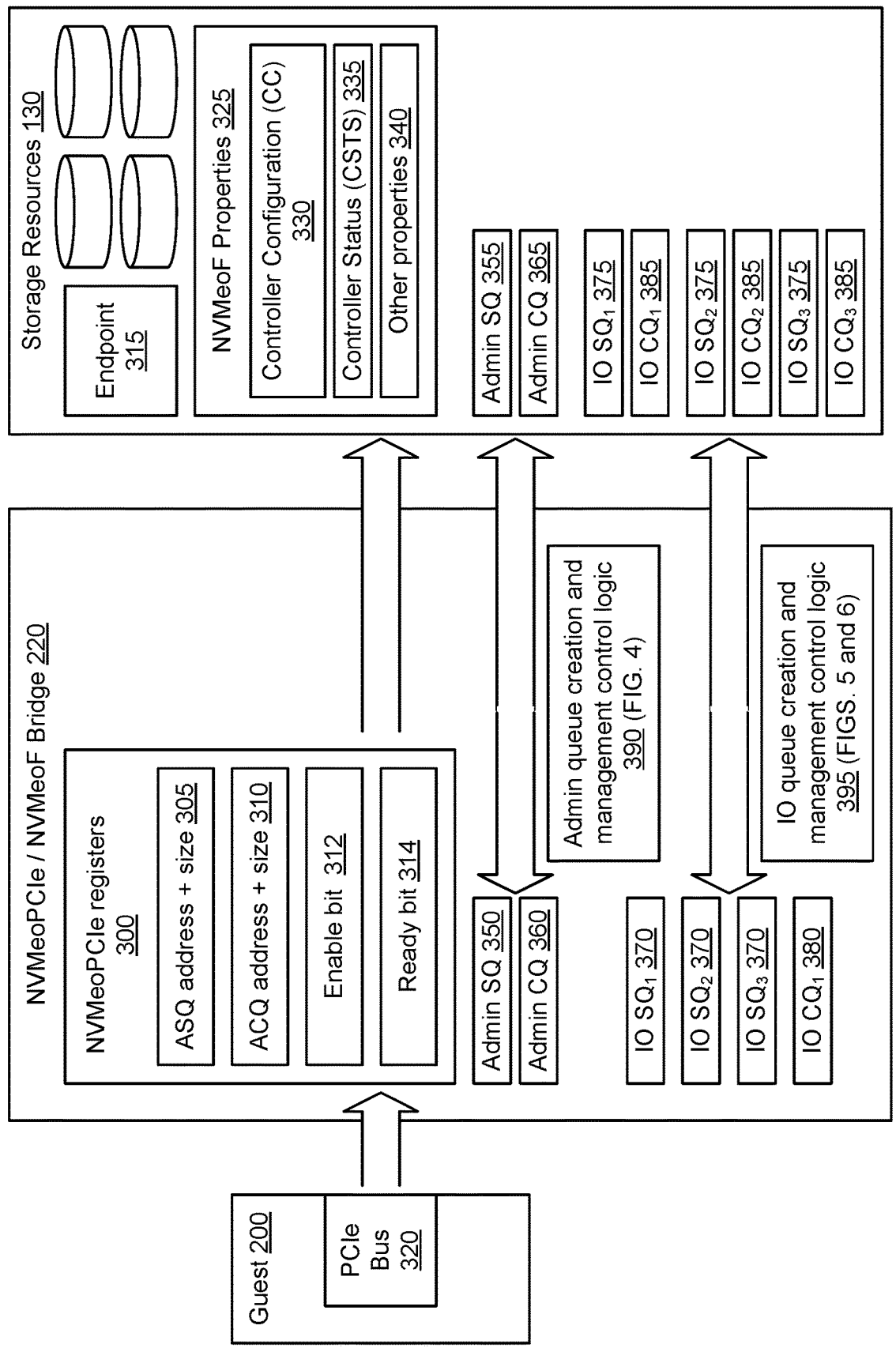
FIG. 3 is a functional block diagram of an example NVMeoPCIe to NVMeoF bridge implemented by the hypervisor of FIG. 2, according to some embodiments.

FIG. 3 is a functional block diagram of an example NVMeoPCIe to NVMeoF bridge implemented by the hypervisor of FIG. 2 in greater detail, according to some embodiments. As shown in FIG. 3, in some embodiments the NVMeoPCIe to NVMeoF bridge 220 has a set of NVMeoPCIe registers 300 and a set of NVMeoF device properties 325. Example registers might include the address and size of an Administrative Submission Queue (ASQ) 305, an address and size of an Administrative Completion Queue (ACQ) 310, and various other registers such as an enable bit 312 in a Controller Configuration (CC) register and a ready bit 314 in a Controller Status (CS) register. Additional registers may be used for other purposes.

NVMeoF refers to "properties" instead of "registers" and, accordingly, in some embodiments the NVMeoPCIe to NVMeoF bridge includes a set of NVMeoF properties 325. Example properties, might include Controller Configuration (CC) property 330 and a Controller Status (CSTS) property 335, and one or more other properties 340.

As noted above, both NVMeoPCIe and NVMeoF versions of the NVMe I/O protocol have the same queue concept. However, there are some differences between how the queues are created and the dependencies between the queues that make creation and management of the queues complicated. Additional details associated with queue creation and management are described in connection with FIGS. 4-6. As shown in FIG. 3, in some embodiments, once the NVMeoPCIe to NVMeoF bridge is configured, on the PCIe side (left-hand side in FIG. 3) the bridge will have an administrative (admin) submission queue (admin SQ) 350, an administrative completion queue (admin CQ) 360, one or more I/O submission queues (I/O SQ) 370, and one or more I/O completion queues (I/O CQ) 380. The admin SQs and admin CQs are used to pass administrative traffic, and are not used for I/O traffic. The I/O submission queues 370 and I/O completion queues 380 are used for read and write I/O operations on associated storage resources. On the NVMeoF side (right-hand side in FIG. 3), the bridge will similarly have created an admin SQ 355 and an admin CQ 365, one or more I/O submission queues (I/O SQ) 375, and one or more I/O completion queues (I/O CQ) 385 on storage resources 130.

In the NVMeoPCIe version of the NVMe I/O protocol, it is possible to have multiple I/O Submission Queue (SQs) 370 associated with a single I/O Completion Queue (CQ) 380. FIG. 3 provides an example in which there are three I/O SQs 370 on the NVMeoPCIe side (I/O $SQ_1$, I/O $SQ_2$, I/O SQs) associated with a single I/O CQ 380. In the NVMeoF version of the NVMe I/O protocol, by contrast, creation of an I/O SQ 375 automatically results in creation of a corresponding I/O CQ 385. Accordingly, in NVMeoF, each I/O SQ 375 is required to be uniquely associated with an I/O CQ 385. Accordingly, if there are three I/O SQs on the NVMeoPCIe side, to create 3 IOSQs on the NVMeoF side it is also necessary to create three I/O CQs on the NVMeoF side. In the example shown in FIG. 3, on the NVMeoF side (left-hand side side) there are three pairs of I/O SQs 375 and I/O CQs 385 (I/O $SQ_1$ & I/O $CQ_1$, I/O $SQ_2$ & I/O $CQ_2$, I/O $SQ_3$ & I/O $CQ_3$).

FIG. 4 is a swim lane diagram showing operation of example control logic of the NVMeoPCIe to NVMeoF bridge configured to implement administrative submission queue (admin SQ) creation and administrative completion queue (admin CQ) creation, according to some embodiments. Most of the differences between the two versions of the NVMe I/O protocol are in how SQs and CQs are created, and these differences are what create challenges for the bridging hypervisor.

As shown in FIG. 4, in the NVMeoPCIe version of the NVMe I/O protocol, the very first SQ created is referred to as the Admin Submission Queue (ASQ) 350, and the very first CQ created is referred to as the Admin Completion Queue (ACQ) 360. These admin queues 350, 360 are only used for non-I/O commands (administrative commands). In NVMeoPCI, the ASQ 350 and ACQ 360 are created by programming PCIe device registers. Specifically, in some embodiments, the guest writes the memory addresses and sizes for the ASQ and the ACQ into the registers 305, 310 for those value (FIG. 4, arrow 400). The guest also sets the Enable bit 312 in the Controller Configuration (CC) register (arrow 405). The guest then waits (arrow 410) for the Ready bit 314 in the Controller Status (CS) register to become set.

In some embodiments, the administrative queue creation and management control logic 390 of the NVMeoPCIe to NVMeoF bridge is configured to recognize this guest NVMeoPCIe ASQ/ACQ sequence (arrow 415), and generate the equivalent NVMeoF ASQ/ACQ sequence to the storage (arrow 420).

In some embodiments, the NVMeoPCIe to NVMeoF bridge uses a NVMeoF Connect command to create corresponding admin SQ 355 and admin CQ 365. For example, in some embodiments, the hypervisor transmits a Connect command with the size for the ASQ and identifiers for the guest (arrow 420) to the NVMeoF storage endpoint 315 on storage resources 130. After that command succeeds (arrow 425), the hypervisor transmits a Property Set command to set the Enable bit in the Controller Configuration (CC) property 340 (arrow 430). After that command succeeds (arrow 435), the hypervisor repeatedly transmits Property Get commands for the Controller Status (CS) property (arrow 440) until one succeeds with the Ready bit set—property 340 (arrow 445). Once this sequence is complete, the hypervisor can set its own Controller Status (CS) Ready bit 314 (arrow 450) for the guest to see (arrow 455).

Only the ASQ and ACQ are created in this way (and the NVMeoF ACQ is implicitly created by the Connect command). All later SQs and CQs are for I/Os only, and they are created by issuing commands on the ASQ 350. However, the protocol for this, and how these SQs and CQs may be linked, are also different between the NVMeoPCIe version of the NVMe I/O protocol and the NVMeoF version of the NVMe I/O protocol.

The NVMeoPCIe version of the NVMe I/O protocol supports independently created I/O CQs and I/O SQs. Specifically, there is one admin command that is used to create an I/O CQ, and another admin command that is used to create an I/O SQ and associate it with a previously-created I/O CQ. In this way, every I/O SQ is associated with exactly one I/O CQ, but the guest may choose to associate multiple I/O SQs with the same I/O CQ.

The NVMeoF version of the NVMe I/O protocol does not support independent I/O CQs and I/O SQs. In the NVMeoF version of the NVMe I/O protocol, the Connect command is used to create an I/O SQ 375. That command (Connect) also implicitly creates a corresponding I/O CQ 385, that is associated only with the I/O SQ that was created using the Connect command. The bridging hypervisor must recognize when the guest issues NVMeoPCIe admin commands to create I/O CQs and I/O SQs, and generate the equivalent NVMeoF commands (if any) to the storage, and the bridging hypervisor must also maintain the ability, on the NVMeoPCIe side, for multiple I/O SQs to be associated with a single I/O CQ. This requires the bridging hypervisor to monitor the admin commands issued by the guest on the NVMeoPCIe admin SQ 350, and act responsively to create the necessary structures on the NVMeoF side.

FIG. 5 is a swim lane diagram showing operation of example control logic of the NVMeoPCIe to NVMeoF bridge 220 configured to perform I/O submission queue and I/O completion queue (CQ) creation and bridge unmanaged administrative commands, according to some embodiments. In some embodiments, the I/O queue creation and management control logic 395 monitors the PCIe bus for admin commands (arrow 500). Any admin commands are added to the admin SQ 350. Once the admin commands have been completed, the response is placed in the admin CQ 360.

For example, when the guest submits a Create CQ admin command to create an NVMeoPCIe I/O CQ 380 (arrow 505), the hypervisor must intercept this admin command (arrow 510) because the NVMeoF version of the NVMe I/O protocol does not have a corresponding create CQ command. The control logic 395 manages the create CQ separately—creating a purely NVMeoPCIe completion queue, separate from the NVMeoF completion queues that are used by the storage, because the hypervisor must support the many-SQs-to-one-CQ behavior of NVMeoPCI.

But the hypervisor doesn't completely hide this NVMeoPCIe Create CQ command from the NVMeoF storage (arrow 515). Rather, in some embodiments, to simplify admin completion queue management, every admin command that is submitted by the guest on NVMeoPCIe admin SQ, must result in "some" admin command submitted to the NVMeoF storage. This allows the storage to respond to the NVMeoF, which generates a response that is added to the NVMeoF CQ 365, that can be passed to the NVMeoPCIe CQ 360. In some embodiments, a harmless dummy command is used for this purpose (arrow 520). By using a substitute admin command (a dummy command that causes no changes except to return a completion), that is submitted in place of the not supported "PCIe Create Completion Queue" command, it is possible to have the NVMeoF storage respond to the dummy command. When a response to the dummy command returns from the storage, the hypervisor substitutes its own completion in the admin CQ 360 for the guest to see.

As another example, when the guest submits a Create SQ admin command to create an I/O SQ (arrow 525), the hypervisor must intercept this command (arrow 530) and substitute a Connect command (arrow 535) to the NVMeoF storage, and then manage the association between the resulting NVMeoF I/O CQ (coupled with the NVMeoF I/O SQ), and the previously-created, decoupled NVMeoPCIe I/O CQ.

Additionally, some other admin commands are supported on both NVMeoPCIe and NVMeoF, but with some differences that require special handling of either the command that goes to the NVMeoF storage, and/or the completion from the NVMeoF storage. The bridging hypervisor must also intercept these and manage these differences. For example, one admin command that can require special handling by the bridging hypervisor is a NVMe "Set Features" command. Both NVMeoPCIe and NVMeoF support the Set Features command for the "Number of Queues" feature, but the hypervisor must manage this command, both to cap the guest's requested queue counts to the hypervisor's own limits, and to hide the CQ value from the NVMeoF storage, which doesn't support independent CQs. Then, the hypervisor must also manage the completion, both to cap the storage's reported SQ count to the hypervisor's own limits, and to reintroduce the CQ value.

All other admin commands are not intercepted, and are simply submitted to the NVMeoF storage (arrows 540), and their completions passed directly back to the guest (arrows 545).

This gives three types of NVMeoPCIe admin commands:
Unmanaged admin commands. These types of commands are not intercepted at all. One example of an unmanaged admin command is an Asynchronous Event Request, which the guest 200 may submit to enable the controller to report asynchronous events such as the current status, health, or error information.
Managed and terminated admin commands. These types of commands are intercepted, and handled entirely by the hypervisor. The Create CQ command is one example of a managed and terminated admin command. A substitute admin command (a dummy command that causes no changes except to return a completion) is submitted in its place to the NVMeoF storage. When the completion for that dummy command returns from the storage, the hypervisor substitutes its own completion for the guest to see.
Managed and shared admin commands. These types of commands are intercepted, and handled by the hypervisor, which submits (a possibly modified version of) the admin command to the NVMeoF storage, and possibly modifies the completion that it eventually returns to the guest. The Create SQ command is one example of a managed and shared admin command.

Another difference between the NVMeoPCIe version of the NVMe I/O protocol and the NVMeoF version of the NVMe I/O protocol, is that the NVMeoPCIe version of the NVMe I/O protocol supports deleting I/O submission queues individually. In the NVMeoF version of the NVMe I/O protocol, by contrast, once an I/O SQ is created, the only way that an NVMeoF I/O I/O SQ ceases to exist, is if all of the I/O SQs are destroyed, by ending the entire association with the storage. Accordingly, in some embodiments, when the NVMeoPCIe to NVMeoF bridge receives a delete I/O SQ command on the NVMeoPCIe admin SQ 370, the NVMeoPCIe to NVMeoF bridge disables the I/O SQ 370 without deleting it from the bridge.

FIG. 6 is a swim lane diagram showing operation of example control logic of the NVMeoPCIe to NVMeoF bridge 220 configured to handle NVMeoPCIe administrative commands to delete I/O SQs, restart I/O SQs, and to bridge I/O operations between NVMeoPCIe and NVMeoF versions of the NVMe I/O protocol, according to some embodiments. As shown in FIG. 6, to support deletion of NVMeoPCIe I/O SQs, in some embodiments the bridging hypervisor is configured to intercept the NVMeoPCIe Delete I/O SQ admin command (arrow 605) (it is another managed and terminated admin command), and simulate it locally (arrow 610), without actually deleting the I/O SQ 375 at the NVMeoF storage (since there is no way to do that). Any attempts by the guest to submit commands to a deleted I/O SQ 370 (arrow 615) will result in an error as described in the standard (arrow 620), even though the I/O SQ 370 still exists on the NVMeoPCIe to NVMeoF bridge 220.

If the guest ever attempts to re-create the NVMeoPCIe I/O SQ 370 (arrow 625), then (assuming that the size of the attempted re-created NVMeoPCIe I/O SQ 370 is not greater than the original SQ size) (arrow 630) the NVMeoPCIe to NVMeoF bridge 220 resumes using the NVMeoPCIe I/O SQ 370 and the NVMeoF I/O SQ 375 (arrow 635).

Once the guest's desired queue configuration has been established, the bridging hypervisor's job becomes simply passing I/O commands unmodified between the guest and the storage. Arrows 640 show I/O commands passing unmodified from the guest to the storage, and arrows 645 show I/O responses passing unmodified from the storage to the guest. Each I/O storage access operation is passed to the hypervisor, put into one of the NVMeoPCIe I/O SQs 370, and bridged to one of the NVMeoF I/O SQs 375. When the storage 130 responds to the I/O storage access operation, the storage access response is placed in one of the NVMeoF I/O CQs 385 and bridged to one of the NVMeoPCIe I/O CQs 380. By transparently bridging I/O storage access requests and responses, the bridging hypervisor 160 is able to enable guests to use the PCIe version of the NVMe I/O protocol. This reduces the complexity of implementation of the guest, since the virtual machines are able to operate in an environment where access to back-end storage resources occurs over a fabric, without requiring the virtual machines to submit storage access I/O operations in conformance with the NVMeoF version of the NVMe I/O protocol.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for hypervisor bridging of different versions of an I/O protocol, the computer program including a set of instructions which, when executed by a computer, cause the computer to perform a method comprising the steps of:

receiving, by the hypervisor, a first request from a guest using a first version of the I/O protocol to create a first protocol admin Submission Queue (ASQ) and first protocol admin Completion Queue (ASQ) to be used to handle administrative commands using the first version of the I/O protocol;

in response to receiving the first request, transmitting, by the hypervisor, a second request to a second protocol endpoint using a second version of the I/O protocol to create a second protocol admin Submission Queue (ASQ) and second protocol admin Completion Queue (ACQ) to be used to handle administrative commands using the second version of the I/O protocol;

receiving a confirmation message, from the second protocol endpoint indicating that the second protocol ASQ and second protocol ACQ have been configured;

in response to receiving the confirmation message, changing a status of the first protocol ASQ and the first protocol ACQ to activate the first protocol ASQ and first protocol ACQ;

receiving a third request from the guest using the first version of the I/O protocol to create a first protocol I/O Completion Queue (I/O CQ) to be used to handle I/O operations using the first version of the I/O protocol;

in response to receiving the third request, transmitting, by the hypervisor, a fourth request to the second protocol endpoint using the second version of the I/O protocol to create a second protocol I/O Submission Queue (I/O SQ) and corresponding second protocol I/O Completion Queue (I/O CQ) to be used to handle I/O operations using the second version of the I/O protocol;

receiving a fifth request from the guest using the first version of the I/O protocol to create a first protocol I/O Submission Queue (I/O SQ) to be associated with the first protocol I/O Completion Queue (I/O CQ);

in response to receiving the fifth request:
transmitting a dummy request to the second protocol endpoint using the second version of the I/O protocol;
receiving a response to the dummy request; and
in response to receiving the response to the dummy request, changing a status of the first protocol I/O SQ to activate the first protocol I/O SQ;

receiving, by the hypervisor, a sixth request from the guest using the first version of the I/O protocol to delete the first protocol I/O SQ; and in response to receiving the fifth request, deactivating the first protocol I/O SQ without deleting the second protocol I/O Submission Queue (I/O SQ).

2. The non-transitory tangible computer readable storage medium of claim 1, wherein the first request comprises writing addresses and sizes for the first protocol ASQ and the first protocol ACQ by the guest into registers in the hypervisor.

3. The non-transitory tangible computer readable storage medium of claim 1, further comprising bridging unmanaged admin commands, by the hypervisor, from the first protocol ASQ to the second protocol ASQ, and from the second protocol ACQ to the first protocol ACQ.

4. The non-transitory tangible computer readable storage medium of claim 1, further comprising bridging I/O operations, by the hypervisor, from the first protocol I/O SQ to the second protocol I/O SQ, and from the second protocol I/O CQ to the first protocol I/O CQ.

5. The non-transitory tangible computer readable storage medium of claim 1, wherein the I/O protocol is Non-Volatile Memory express (NVMe), the first version of the I/O protocol is a version of NVMe configured to be implemented over a Peripheral Connect Internet Express bus (NVMeoPCIe), and the second version of the I/O protocol is a version of NVMe configured to be implemented over a fabric (NVMeoF).

6. A method of hypervisor bridging of different versions of an I/O protocol, comprising:

receiving, by the hypervisor, a first request from a guest using a first version of the I/O protocol to create a first protocol admin Submission Queue (ASQ) and first protocol admin Completion Queue (ASQ) to be used to handle administrative commands using the first version of the I/O protocol;

in response to receiving the first request, transmitting, by the hypervisor, a second request to a second protocol endpoint using a second version of the I/O protocol to create a second protocol admin Submission Queue (ASQ) and second protocol admin Completion Queue (ACQ) to be used to handle administrative commands using the second version of the I/O protocol;

receiving a confirmation message, from the second protocol endpoint indicating that the second protocol ASQ and second protocol ACQ have been configured;

in response to receiving the confirmation message, changing a status of the first protocol ASQ and the first protocol ACQ to activate the first protocol ASQ and first protocol ACQ;

receiving a third request from the guest using the first version of the I/O protocol to create a first protocol I/O Completion Queue (I/O CQ) to be used to handle I/O operations using the first version of the I/O protocol;

in response to receiving the third request, transmitting, by the hypervisor, a fourth request to the second protocol endpoint using the second version of the I/O protocol to create a second protocol I/O Submission Queue (I/O SQ) and corresponding second protocol I/O Completion Queue (I/O CQ) to be used to handle I/O operations using the second version of the I/O protocol;

receiving a fifth request from the guest using the first version of the I/O protocol to create a first protocol I/O Submission Queue (I/O SQ) to be associated with the first protocol I/O Completion Queue (I/O CQ);

in response to receiving the fifth request:
  transmitting a dummy request to the second protocol endpoint using the second version of the I/O protocol;
  receiving a response to the dummy request; and
  in response to receiving the response to the dummy request, changing a status of the first protocol I/O SQ to activate the first protocol I/O SQ;

receiving, by the hypervisor, a sixth request from the guest using the first version of the I/O protocol to delete the first protocol I/O SQ; and in response to receiving the fifth request, deactivating the first protocol I/O SQ without deleting the second protocol I/O Submission Queue (I/O SQ).

7. The method of claim 6, wherein the first request comprises writing addresses and sizes for the first protocol ASQ and the first protocol ACQ by the guest into registers in the hypervisor.

8. The method of claim 6, further comprising bridging unmanaged admin commands, by the hypervisor, from the first protocol ASQ to the second protocol ASQ, and from the second protocol ACQ to the first protocol ACQ.

9. The method of claim 6, further comprising bridging I/O operations, by the hypervisor, from the first protocol I/O SQ to the second protocol I/O SQ, and from the second protocol I/O CQ to the first protocol I/O CQ.

10. The method of claim 6, wherein the I/O protocol is Non-Volatile Memory express (NVMe), the first version of the I/O protocol is a version of NVMe configured to be implemented over a Peripheral Connect Internet Express bus (NVMeoPCIe), and the second version of the I/O protocol is a version of NVMe configured to be implemented over a fabric (NVMeoF).

11. A system, comprising:
a processor;
a hypervisor executing on the processor;
a memory device; and
wherein the hypervisor is programmed to:

receive a first request from a guest using a first version of the I/O protocol to create a first protocol admin Submission Queue (ASQ) and first protocol admin Completion Queue (ASQ) to be used to handle administrative commands using the first version of the I/O protocol;

in response to receiving the first request, transmit a second request to a second protocol endpoint using a second version of the I/O protocol to create a second protocol admin Submission Queue (ASQ) and second protocol admin Completion Queue (ACQ) to be used to handle administrative commands using the second version of the I/O protocol;

receive a confirmation message, from the second protocol endpoint indicating that the second protocol ASQ and second protocol ACQ have been configured;

in response to receiving the confirmation message, change a status of the first protocol ASQ and the first protocol ACQ to activate the first protocol ASQ and first protocol ACQ;

receive a third request from the guest using the first version of the I/O protocol to create a first protocol I/O Completion Queue (I/O CQ) to be used to handle I/O operations using the first version of the I/O protocol;

in response to receiving the third request, transmitting, by the hypervisor, a fourth request to the second protocol endpoint using the second version of the I/O protocol to create a second protocol I/O Submission Queue (I/O SQ) and corresponding second protocol I/O Completion Queue (I/O CQ) to be used to handle I/O operations using the second version of the I/O protocol;

receive a fifth request from the guest using the first version of the I/O protocol to create a first protocol I/O Submission Queue (I/O SQ) to be associated with the first protocol I/O Completion Queue (I/O CQ);

in response to receiving the fifth request:
  transmit a dummy request to the second protocol endpoint using the second version of the I/O protocol;
  receive a response to the dummy request; and
  in response to receiving the response to the dummy request, change a status of the first protocol I/O SQ to activate the first protocol I/O SQ;

receive, by the hypervisor, a sixth request from the quest using the first version of the I/O protocol to delete the first protocol I/O SQ; and in response to receiving the fifth request, deactivating the first protocol I/O SQ without deleting the second protocol I/O Submission Queue (I/O SQ).

12. The system of claim 11, wherein the I/O protocol is Non-Volatile Memory express (NVMe), the first version of the I/O protocol is a version of NVMe configured to be implemented over a Peripheral Connect Internet Express bus (NVMeoPCIe), and the second version of the I/O protocol is a version of NVMe configured to be implemented over a fabric (NVMeoF).

* * * * *